US011067512B1

(12) United States Patent
    Charache et al.

(10) Patent No.: US 11,067,512 B1
(45) Date of Patent: Jul. 20, 2021

(54) METHOD FOR SELECTION OF RAMAN EXCITATION WAVELENGTHS IN MULTI-SOURCE RAMAN PROBE

(71) Applicant: Innovative Photonic Solutions, Inc., Monmouth Junction, NJ (US)

(72) Inventors: Greg W. Charache, East Windsor, NJ (US); Scott L. Rudder, Hopewell, NJ (US)

(73) Assignee: Innovative Photonic Solutions, Inc., Monmouth Junction, NJ (US)

( * ) Notice: Subject to any disclaimer, the term of this patent is extended or adjusted under 35 U.S.C. 154(b) by 0 days.

(21) Appl. No.: 16/831,611

(22) Filed: Mar. 26, 2020

(51) Int. Cl.
    *G01J 3/44* (2006.01)
    *G01N 21/65* (2006.01)

(52) U.S. Cl.
    CPC ..... *G01N 21/65* (2013.01); *G01N 2201/0636* (2013.01); *G01N 2201/06113* (2013.01)

(58) Field of Classification Search
    CPC ......... G01N 21/65; G01N 2201/06113; G01N 2201/0636; G01J 3/44; G01J 3/02; A61B 5/0075
    See application file for complete search history.

(56) References Cited

U.S. PATENT DOCUMENTS

| 6,124,928 | A  | * | 9/2000 | Slater | .................. | G01J 3/44 356/301 |
|-----------|----|---|--------|--------|-----|-----|
| 9,059,555 | B2 |   | 6/2015 | Connolly | | |
| 9,577,409 | B1 |   | 2/2017 | Connolly | | |
| 10,359,313 | B1 |   | 7/2019 | Rudder | | |

OTHER PUBLICATIONS

"Spatially Compressed Dual-Wavelngth Excitation Raman Spectromerter," Cooper, J. B,. Optical Society of America, 2014.
"Dual-Wavelength Raman Spectroscopy: Improved Compactness and Spectral Resolution", Kiefer, J., American Pharmaceutical Review, 2018.
Laura E. Masson, Christina M. O'Brien, et. al, Dual Excitation Wavelength System for Combined Fingerprint and High Wavenumber Raman Spectroscopy, Analyst 2018, 143 pp. 6049-6080.
European Search Report issued in response to foreign counterpart application, dated Jan. 21, 2021.

* cited by examiner

*Primary Examiner* — Abdullahi Nur
(74) *Attorney, Agent, or Firm* — Law Office of Carl Giordano, PC

(57) ABSTRACT

A method is disclosed for providing enhanced quantitative analysis of materials by a dual-laser Raman probe wherein the wavelengths of the lasers used to illuminate a target object are selected in a manner to improve and enhance the quantitative analysis performance of the Raman signals.

19 Claims, 11 Drawing Sheets

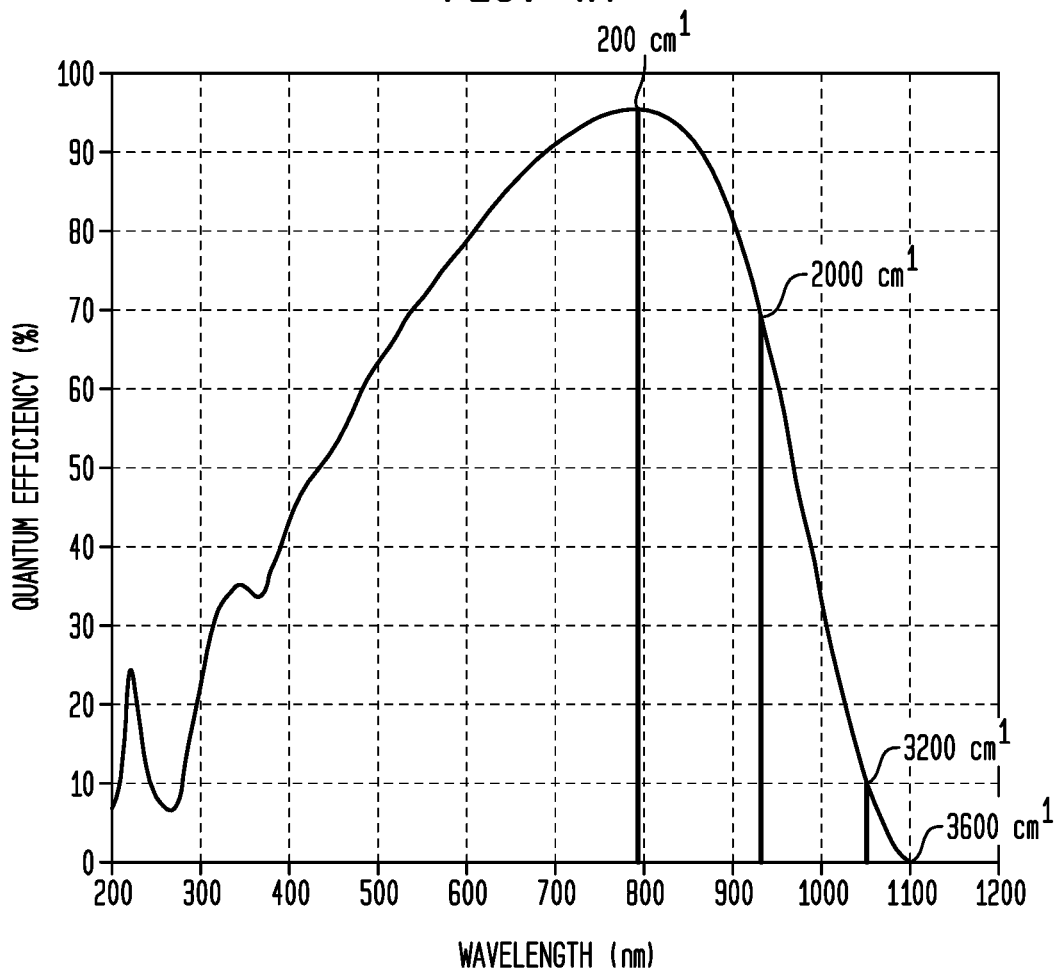

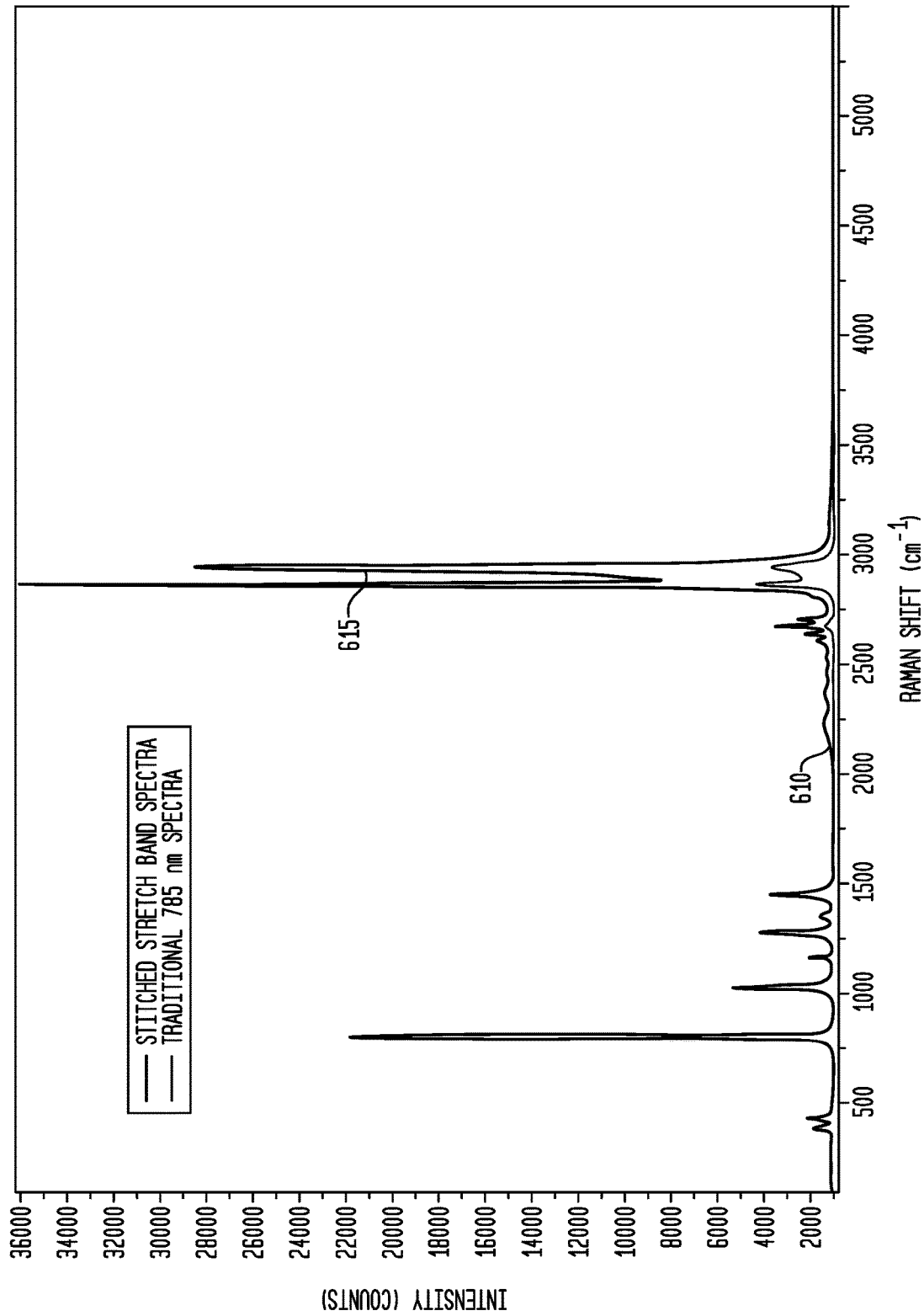

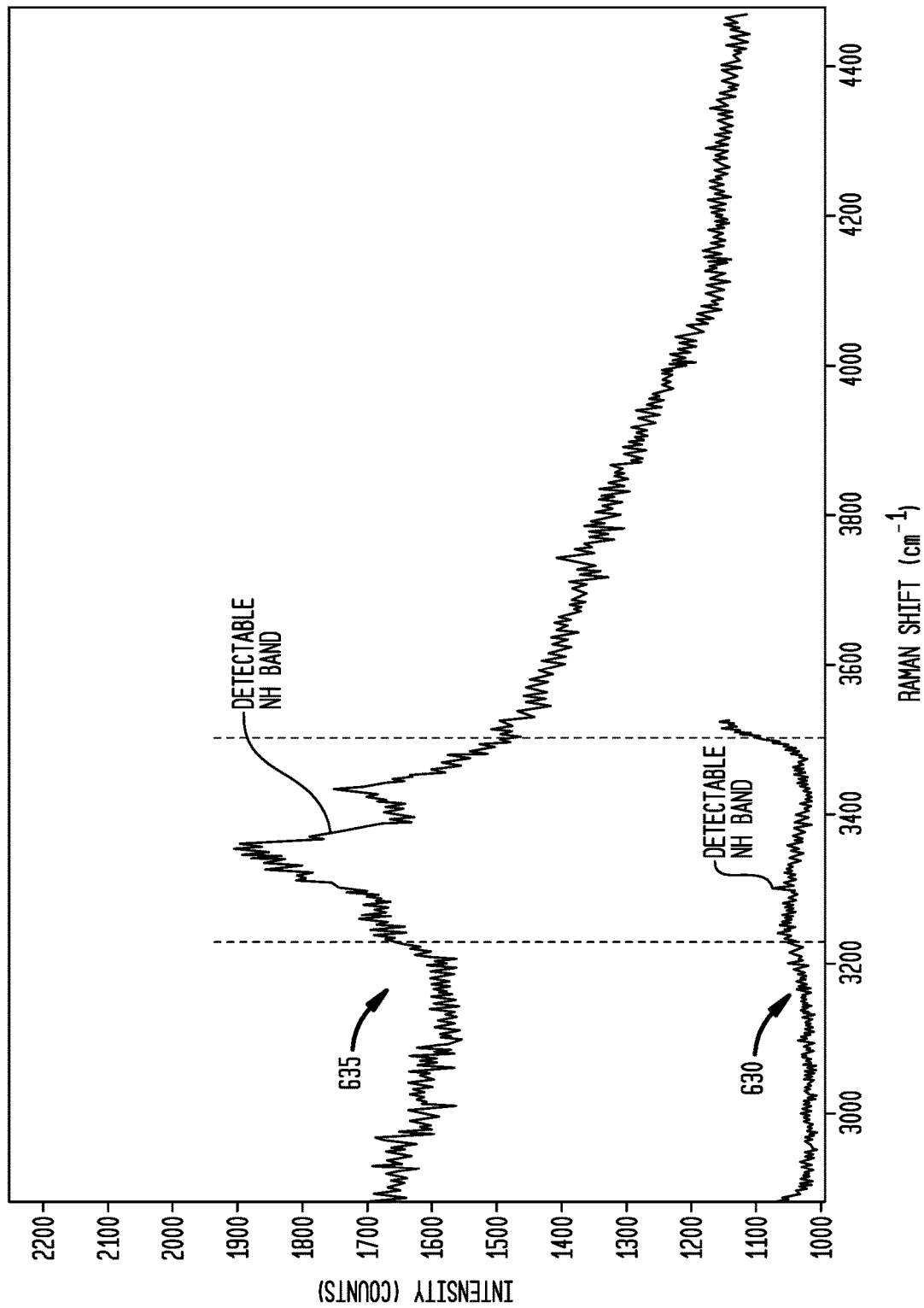

WATER

METHOD FOR SELECTION OF RAMAN EXCITATION WAVELENGTHS IN MULTI-SOURCE RAMAN PROBE

RELATED PATENTS

This Invention disclosed, herein, is related to that subject matter recited and taught in U.S. Pat. No. 10,359,313, the contents of which are incorporated by reference, herein.

FIELD OF THE INVENTION

This invention relates to the field of spectroscopy and more particularly to a compact Raman spectroscopy system and method for providing enhanced quantitative analysis for process control

BACKGROUND OF THE INVENTION

Raman spectroscopy is a well-known technique that can be used to observe vibrational, rotational and other low-frequency modes in molecules. Raman scattering is an inelastic process whereby monochromatic light typically provided by a laser interacts with molecular vibrations phonons or other excitations resulting in the energy of the laser photons being shifted up or down. Due to conservation of energy the emitted photon gains or loses energy equal to energy of the vibrational state.

Many Raman measurements suffer from fluorescence, which forces usage of longer wavelength (lower energy) excitation lasers to mitigate against the fluorescent signal overwhelming the Raman signal, thereby making the latter impossible to extract. Usage of longer excitation wavelengths facilitates extraction of Raman signals from fluorescent samples but at a cost of reduced sensitivity in the silicon CCD detectors that capture spectrometer signals.

Known Raman probes that capture a Raman spectra covering the entire range of wavenumbers from 0 $cm^{-1}$ to 4000 $cm^{-1}$ can be accomplished by use of:

(1) a single laser source with a large spectrometer incorporating long sensors to capture photons at all relevant wavenumbers with sufficient resolution;

(2) a single laser source with multiple spectrometers/detectors that each cover a different wavelength range (e.g. silicon and InGaAs);

(3) multiple laser sources with a single spectrometer, or (4) multiple laser sources with separate spectrometers configured to capture multiple Raman spectra each covering a smaller range of wavenumbers.

Examples of the use multiple laser techniques are disclosed by:

"Novel Pressure-Induced Molecular Transformations Probed by in Situ Vibrational Spectroscopy", Yang Song, "Applications of Molecular Spectroscopy to Current Research in the Chemical and Biological Sciences", Mark T. Stauffer (ed.), Oct. 5, 2016. Chapter 8, "Spatially Compressed Dual-Wavelength Excitation Raman Spectrometer," J. B. Cooper, S. Marshall, R. Jones, M. Abdelkader, and K. L Wise, Applied Optics, 53, 3333 (2014);

"Dual Wavelength Raman Spectroscopy: Improved Compactness and Spectral Resolution," J. Kiefer, https://www.americanpharmaceuticalreview.com/Featured-Articles/354694-Dual-Wavelength-Raman-Spectroscopy-lmproved-Compactness-and-Spectrai-Resolution/ posted 16 Oct. 2018.

"Raman Fusion Spectroscopy: Multiwavelength Excitation for Compact Devices, J. Kiefer, SciX 2019. {13-18 Oct. 2019).

"Apparatus and Method for Composite Raman Multispectral Spectrometry", BRUNEEL, Jean-Luc, BUFFETEAU, Thierry, DAUGEY. Nicolas, RODRIGUEZ, Vincent, WO2019220047 (2019) and U.S. Pat. No. 10,359,313, which is assigned to the Assignee of the Assignee of the instant application and whose contents are incorporated by reference, herein.

Each of the referred to references focus on capture multiple Raman spectra using dual laser configuration. However, the references fail to disclose the means for selecting wavelengths used in the spectral analysis based on the material selected and the characteristics of the spectrometer utilized.

Hence, there is a need in the industry for a compact Raman probe and spectrometer system that provides for improved quantitative analysis using two or more probe laser wavelengths and a method for selecting the laser probe wavelengths to enhance a quantitative analysis of a target material under investigation for different applications.

SUMMARY OF THE INVENTION

The Raman spectral concatenation concept described herein allows use of a single, relatively compact spectrometer to collect both Fingerprint and Stretch Raman spectra and a method for selecting the laser source wavelengths to provide for enhanced quantitative analysis of target material under investigation. In accordance with the principles of the invention, the Fingerprint spectrum is captured using one excitation wavelength, whereas the Stretch spectrum is captured using a second wavelength selected based on a quantum efficiency of the spectrometer and the first wavelength. The selection of one or more of the laser source wavelengths in the manner disclosed, herein, provides for enhanced signal to noise ratio so as to enhance the performance of a quantitative analysis of a target material under investigation.

A compact dual-wavelength Raman probe configured to provide two separate laser wavelengths selected in a manner to provide enhanced quantitative analysis of material under investigation is disclosed Described herein are embodiments in which two laser sources may be integrated within the housing of a Raman probe and embodiments in which two laser sources are utilized, wherein the wavelengths of the laser sources or probes are selected in a manner based, in part, on the quantum efficiency of the spectrometer using for the analysis of the light reflected by the target material.

In accordance with the principles of the invention, the wavelengths of the probe lasers used in a dual-wavelength Raman probe are selected based on the quantum efficiency of a spectrometer comprising a single detector array (silicon, InGaAs, or any other detector array) within the spectrometer.

In accordance with the principles of the invention, the probe laser wavelengths may be determined for different applications based on the quantum efficiency of the spectrometer and the material in a target object such that a desired Raman spectra is substantially coincident to a peak of the detector quantum efficiency and, hence, achieving higher signal to noise ratio.

In accordance with the principles of the invention, the selection of Raman excitation wavelengths based on the quantum efficiency of the spectrometer allows shifting of both the Fingerprint and Stretch regions of the Raman spectrum to wavelengths at which silicon detectors (or similar detectors) have relatively high quantum efficiency.

In one aspect of the invention, Raman spectra of each of the two laser sources may be captured separately and subsequently concatenated, or stitched together, to provide a single spectral scan encompassing the entire range of data, including the Fingerprint and Stretch regions, wherein the signal-to-noise ratio of the Raman signal in the Stretch region is enhanced.

In accordance with one aspect of the invention analyzing each data set independently is also possible, while collecting the spectra from both excitation wavelengths simultaneously may also be possible.

The compact dual-wavelength Raman probe, disclosed herein, may include optics to configure the output beam of each laser source to have an elliptical cross-section, approximating a shape of the elongated emission region of the laser near-field rather than a circular cross-section. The laser beams are transmitted to a target object or material under investigation and the resultant scattered signal light is transmitted by the compact Raman probe via an optical beam that may also have a corresponding elliptical cross-section. An optical fiber incorporating a core having dimensions approximating those of the returned scattered light beam, transmits the returned scattered light to the entrance aperture of a spectrometer.

In accordance with the principles of the invention of the dual-wavelength Raman probe disclosed herein, the dual-wavelength Raman probe may include external cavity lasers (ECLs) that may be integrated into the probe as wavelength-stabilized laser sources. See, for example, U.S. Pat. No. 9,059,555, "Wavelength-Stabilized Diode Laser," the contents of which are incorporated by reference herein. Or may retain the ECLs external to the Raman probe.

In accordance with the principles of the compact Raman probe disclosed herein, a distributed Bragg reflector (DBR) or distributed feedback (DFB) lasers may comprise a wavelength-stabilized laser source that may be integrally incorporated into the Raman probe or may be retained external to the Raman probe.

In accordance with the principles of the compact dual-wavelength Raman probe disclosed herein, the light emitted by a laser may be used as the pump source for a non-linear optical (NLO) conversion to produce a different wavelength, e.g., by second-harmonic generation (SHG), third-harmonic generation (THG), or any other non-linear optical process.

In accordance with the principles of the invention of a compact dual wavelength Raman probe, the selection of a second wavelength is based, in part, on a first wavelength and a spectral efficiency of the spectrometer used to collect the Raman signal.

BRIEF DESCRIPTION OF DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIGS. 4A and 4B illustrate an exemplary quantum efficiency response of a silicon detector linear array with 300 nm dispersion for two different Raman laser pump sources.

FIG. 6A illustrates an exemplary spectral analysis of a target material containing cyclohexane, with and without the selection of excitation wavelengths in accordance with the principles of the invention.

FIG. 6C illustrates an exemplary spectral analysis of a target material containing Urea.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such elements is not provided herein. The disclosure herein is directed to also variations and modifications known to those skilled in the art.

DETAILED DESCRIPTION

Figure 1A:
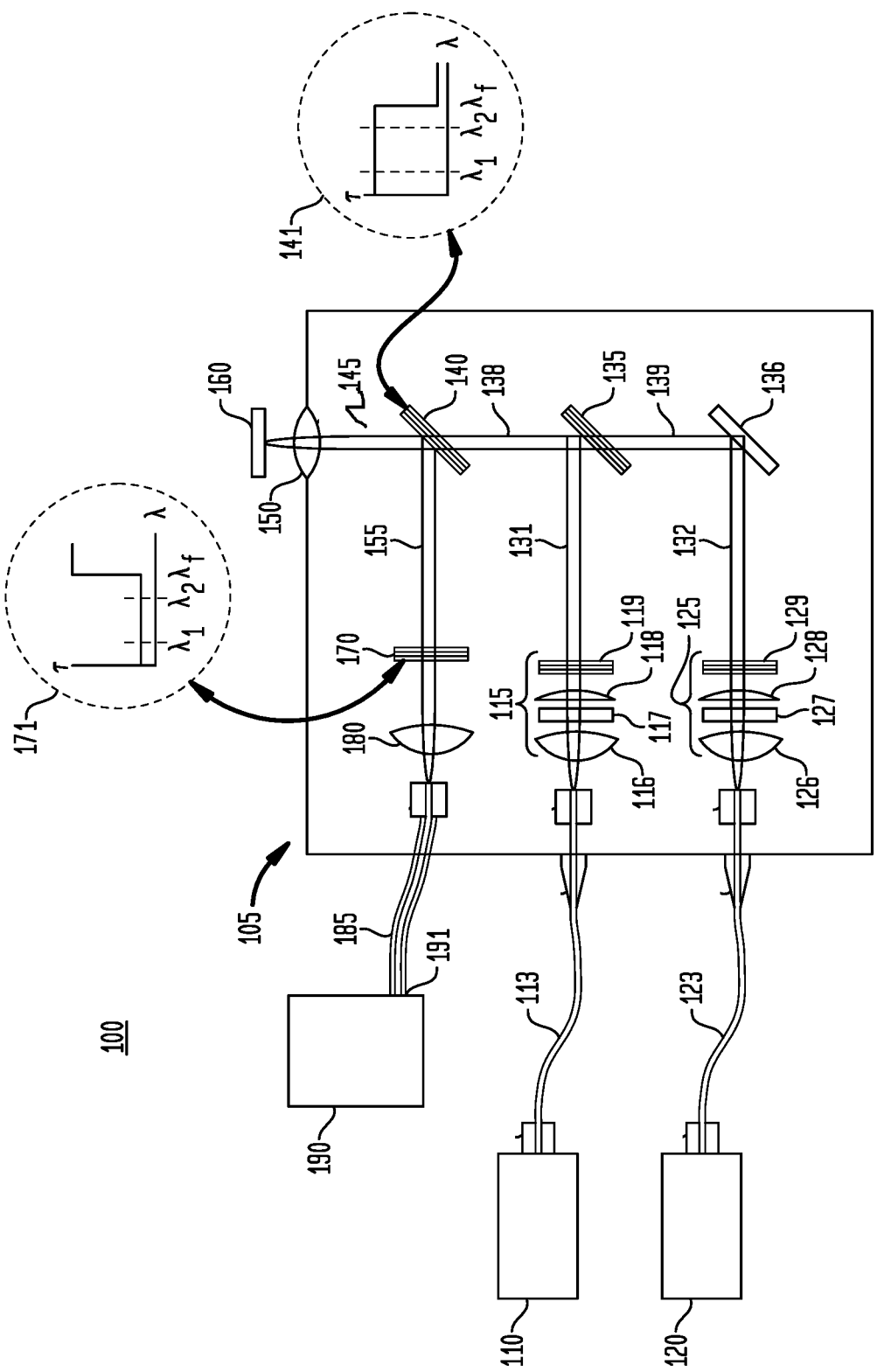
FIG. 1A illustrates a block diagram of an exemplary embodiment of the dual-wavelength Raman probe using external laser sources.

FIG. 1A illustrates a block diagram of an exemplary embodiment of a compact dual-wavelength Raman probe as is disclosed, for example, U.S. Pat. No. 10,359,313, which discloses the use of diode lasers as the light sources in Raman spectroscopy.

In this exemplary embodiment, a dual wavelength Raman probe 100 includes a housing 105 and two external laser sources 110 and 120, coupled via optical fibers 113 and 123, respectively, to the internal optics within housing 100. The lasers 110 and 120 may emit light in a single spatial mode or in multiple spatial modes.

The laser sources 110 and 120 may be any laser device or system; preferably laser sources 110 and 120 are wavelength-stabilized laser sources having narrow bandwidth.

One class of lasers that may be used as a wavelength-stabilized laser source is an external cavity laser. See, for example, U.S. Pat. Nos. 9,059,555 and 9,577,409, which are assigned to the assignee of the instant application and whose contents are incorporated, in their entirety, by reference, herein, describe exemplary external wavelength stabilized diode lasers.

Sources 110, 120 may also be semiconductor lasers that incorporate gratings within their structure, such as a distributed feedback (DFB) or distributed Bragg reflector (DR) laser.

Laser sources 110, 120 may also be a DFB or DBR laser coupled to a non-linear optical element for second- or third-harmonic generation of shorter wavelength laser light, as is well-known in the art.

The compact dual-wavelength Raman probe 100 further includes optics to configure the output beam of the laser sources 110, 120. Exemplary components shown in FIG. 1A, are lenses 116, 117, and 118 to reshape the optical beam associated with laser 110, e.g., to form a beam cross-section suitable for exciting Raman signal at a target of interest, 160, and corresponding components 126, 127, and 128 to reshape the optical beam associated with laser 120. Narrow-band filters 119 and 129 reject spontaneous emission from the outputs of 110 and 120.

Collimated light beams 131 and 132 are combined into a single collimated beam 138 by use of a first dichroic mirror 135. The probe light beam 138 is transmitted through a second short-pass dichroic mirror 140, with transmission characteristics schematically depicted in inset 141, to lens 150 which focuses the combined light, comprising two excitation wavelengths, onto the target 160.

Light scattered from the target 160 will include Raman, Rayleigh and fluorescent components, which may be collected by lens 150 and directed back towards the second dichroic mirror 140. Dichroic mirror 140 is configured to reflect the longer Stokes-shifted Raman photons into collimated beam 155. Light at wavelengths longer than the filter cutoff, including at the two excitation wavelengths, will, to a great extent, pass through second dichroic mirror 140 and be largely eliminated from beam 155.

The spatial extent of the excitation light on the target 160 may be sufficiently long to give rise to off-axis scattered light, which could result in the reflection of a range of wavelengths—including those that would be preferentially excluded—by the second dichroic mirror 140 into beam 155. The design of dichroic mirror 140 preferably is such that unwanted light is eliminated as much as is possible.

Dichroic mirror 140 may be an edge filter that is designed to direct wavelengths of the Raman scattered light toward spectrometer 190, while substantially removing other light near the pump wavelengths. In an embodiment of the invention disclosed in which the Stokes signal wavelength is to be detected, the dichroic mirror 140 is a short-pass filter that reflects wavelengths longer than that of the pump wavelength and substantially removes wavelengths at and shorter than the pump wavelengths from optical path 155. In an embodiment of the invention disclosed, in which anti-Stokes signals are to be detected, the dichroic mirror 140 is along-pass filter that reflects wavelengths shorter than that of the pump wavelength and substantially removes wavelengths at and longer than the pump wavelengths from optical path 155.

Dichroic mirror 140 is typically used at a 45° angle of incidence and, in the embodiment shown in FIG. 1A, transmits light from the laser sources 110 and 120 towards the target 160 under investigation. Exemplary dichroic mirror are Semrock's RAZOREDGE beamsplitters. RAZOREDGE is a registered Trademark of IDEX Health & Science LLC, Rohnert Park, Calif.

For detection of Stokes signals long-pass dichroic filter 170 is designed to transmit wavelengths longer than its cutoff wavelength as shown in inset 171. Lens 180 focuses that light onto the entrance facet of optical fiber 185, which transmits the light to the slit 191 of a compact spectrometer 190, by the combination of the dichroic mirror 140 and filter 170 is desirable.

The filter 170 may be one of: a dichroic filter, a volume holographic grating filter, and a fiber Bragg grating filter, used in combination with focusing and collection optics or any filter that provides the required wavelength-dependent blocking and transmitting capabilities. Exemplary filters include STOPLINE® single notch filters and RAZOREDGE® ultra-steep long-pass edge filters for Stokes detection and ultra-steep short-pass edge filter for anti-Stokes detection. STOPLINE and RAZOREDGE are registered Trademarks of IDEX Health & Science LLC, Rohnert Park, Calif.

Spectrometer 190 is designed to diffract light input through slit 191 to a linear silicon detector array (not shown). The range of light diffracted onto the array is limited by the design of the spectrometer's diffraction grating and linear extent of the detector array as is well-known in the art. Accordingly, a spectrometer's grating and detector may be configured so that the detector receives a limited range of wavelengths, e.g., approximately 791 nm to 934 nm for Stokes signals. An exemplary 2048-element linear detector may have a resolution of approximately 1 $cm^{-1}$ (i.e., 1 wavenumber, wherein wavenumber is a term of art within the optical field) In both the Fingerprint and Stretch regions of the spectrum if detected separately.

In another embodiment of the invention, the light from lasers 110 and 120 of FIG. 1A may be combined onto a single fiber 185 before being transmitted to dichroic mirror 140.

Figure 1B:
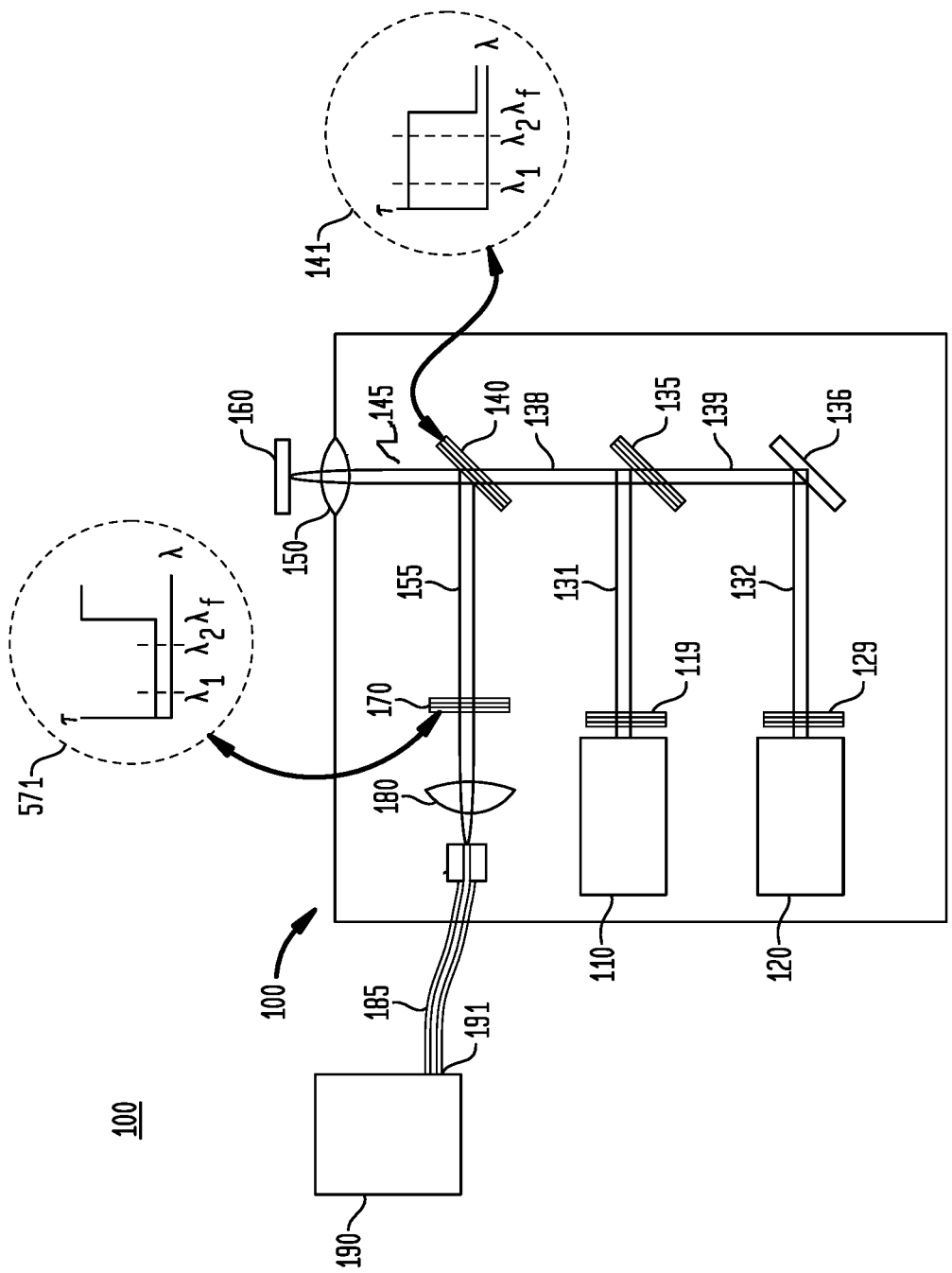
FIG. 1B. illustrates a block diagram of an exemplary embodiment of the dual-wavelength Raman probe using internal laser sources.

FIG. 1B illustrates a second exemplary embodiment of a dual laser Raman probe, wherein the laser sources 110, 120 are incorporated within Raman probe housing 105. In this second exemplary embodiment of a dual-laser Raman probe, the elements are similar to those elements shown and discussed with regard to the dual-wavelength Raman probe shown in FIG. 1A. As both the components and the operation of the configuration shown in FIG. 1B are similar to the components and operation of the dual-laser Raman probe shown in FIG. 1A, the details of the components and operation of the configuration shown in FIG. 1B need not be discussed in further detail.

In accordance with the principles of the invention, the excitation lasers of the Raman Probe (whether FIG. 1A or FIG. 1B) may be operated simultaneously or sequentially. Sequential operation eliminates spurious signals e.g. fluorescence, that may be generated when both sources were to be operated simultaneously. However, it would be understood that simultaneously or concurrent operation has been considered and both concurrent and sequential operation of the laser sources is considered within the scope of the invention. Hence, when the operation of the sources is concurrent, the laser light of the two sources may be combined as in joining together to form a single light beam composed of two wavelengths. Whereas, when the operation of the sources is sequential, then the laser light of one source is combined with the non-presence of light from the second laser light source such that a single beam of a single wavelength is formed. Exemplary Raman pump wavelengths currently in use are 532 nm, 638 nm, 785 nm, 830 nm, and 1064 nm. As is known in the art, shorter wavelength pump wavelengths yield higher Raman scattered signals as the Raman Intensity is proportional to $\lambda^{-4}$. However shorter pump wavelengths are more likely to give rise to fluorescence, which can overwhelm the Raman spectral features. The method of Raman concatenation offers the possibility of mitigating the negative impact of fluorescence with the shorter wavelength excitation source since fluorescence is wavelength dependent while the Raman signal is both proportional to the $\lambda^{-4}$ and shifts with respect to the excitation wavelength. This allows for the possibility of quantifying a Raman signal in the Stretch band when it is not possible to quantify a Raman signal in the Fingerprint region when high levels of fluorescence are present. Finally, the specific wavelength of the short wavelength laser source can be selected to mitigate any fluorescence resonance effects.

Further, Stokes spectra are more typically more intense than are anti-Stokes spectra. As is well known in the art, a Stokes shift of v (measured in wavenumbers, i.e., cm$^{-1}$) will give rise to a Raman signal wavelength, $\lambda_s$, related to the probe wavelength, $\lambda_p$, by:

$$1/\lambda_s = 1/\lambda_p + v \quad (1)$$

Generally, the "Fingerprint" region of the spectrum includes wavenumbers less than about 2000 cm$^{-1}$ whereas the "Stretch" region includes wavenumbers ranging from about 2000 cm$^{-1}$ to 4000 cm$^{-1}$.

Figure 2:
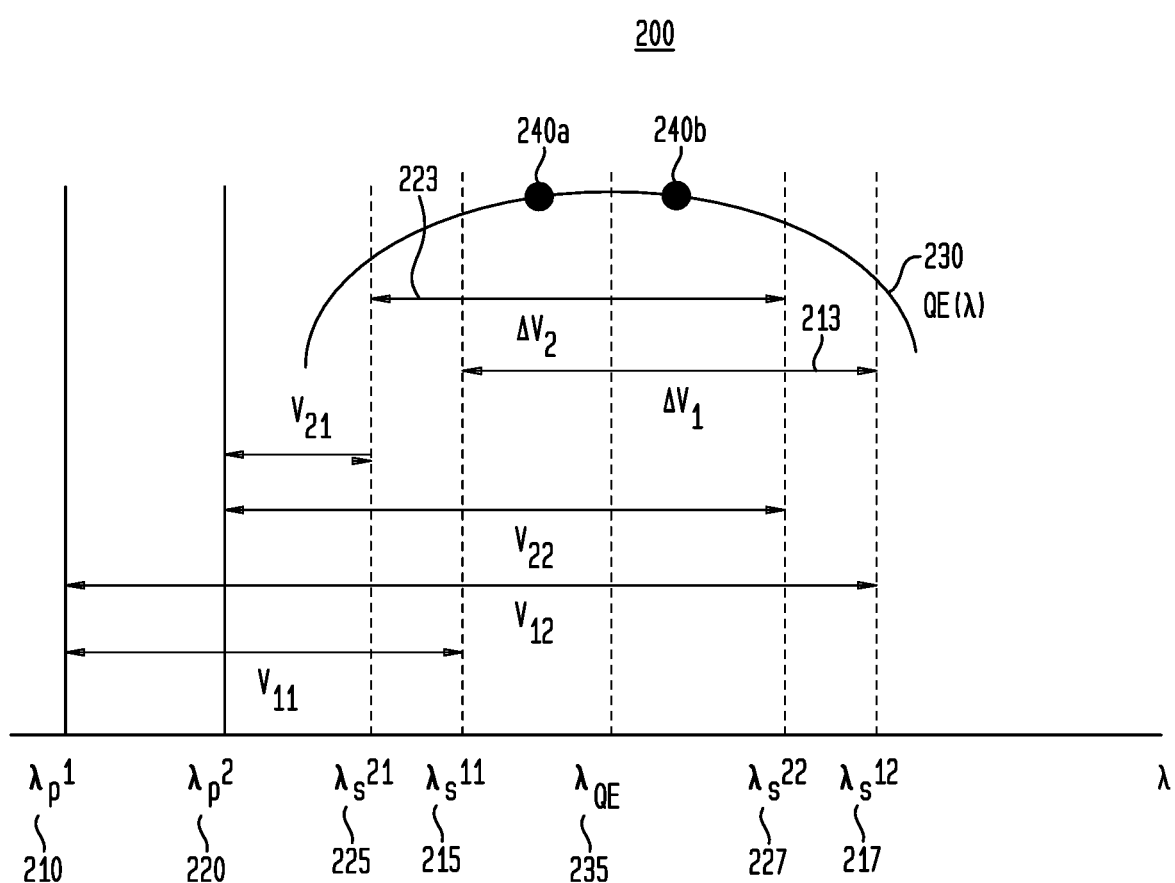
FIG. 2 illustrates a graphical representation for the selection of laser wavelengths in a dual-wavelength Raman probe.

FIG. 2 illustrates an example of the determination of Fingerprint and Stretch regions of a spectrum that may be excited by two separate wavelengths such that the two resultant Stokes signal spectra can be detected using a single detector array in a compact spectrometer.

In accordance with the principles of the invention, the two probe wavelengths designated as $\lambda_p^1$ 210 and $\lambda_p^2$ 220 excite the Stretch and Fingerprint regions of the Raman spectrum, respectively. In this illustrated case, the second excitation wavelength $\lambda_p^1$ is of a shorter wavelength than the first excitation wavelength $\lambda_p^2$ 220.

Further illustrated is an exemplary wavelength range associated with a Fingerprint region, $\Delta v_2$, 223 expressed in wavenumbers. The illustrated Fingerprint region 213 is shown as extending from Raman signal wavelengths $\lambda_s^{21}$ 225 to $\lambda_s^{22}$ 227, which are associated with the first excitation wavelength $\lambda_p^2$ 220. Wavelengths $\lambda_s^{21}$ 215 and $\lambda_s^{22}$ 217 are determined from wavelength $\lambda_p^2$ 220 by shifted values $V_{21}$ and $V_{22}$, respectively, wherein shifted values $V_{21}$ and $V_{22}$ may be determined from equation 1, above.

In this illustrated example, Raman signal wavelength $\lambda_s^{21}$ 225 is conventionally shifted 1-2 nm (nanometers) from first excitation wavelength $\lambda_p^2$ 220 to avoid saturating the spectrometer with the backscattered pump light, while Raman signal wavelength $\lambda_s^{22}$ 227 is determined by calculating the wavelength associated with the Fingerprint wavenumber range, $\Delta v_2$ 223:

$$1/\lambda_s^{22} = 1/\lambda_s^{21} + \Delta v_2 \quad (2)$$

Further Illustrated is a wavelength range associated with the Raman signal Stretch region, $\Delta v_1$, 213 expressed in wavenumbers. The illustrated Stretch region is shown as extending from Raman signal wavelengths $\lambda_s^{11}$ 215 and $\lambda_s^{12}$ 217, which are associated with the second excitation wavelength $\lambda_p^1$ 210. Wavelengths $\lambda_s^{11}$ 215 and $\lambda_s^{12}$ 217 are determined from wavelength from $\lambda_p^1$ 210 by shifted values $V_{11}$ and $V_{12}$, respectively, wherein values $V_{11}$ and $V_{12}$ may be determined from equation 1, above.

Accordingly, Raman signal wavelength $\lambda_s^{12}$ 215 is selected to essentially coincide with $\lambda_s^{21}$ 225 so as enable the detector element of a spectrometer to be utilized for both pump lasers, while Raman signal wavelength $\lambda_s^{12}$ 217 is determined by calculating the wavelength associated with the Stretch wavenumber range, $\Delta v_1$ 213, wherein the difference between $\lambda_s^{11}$ and $\lambda_s^{12}$ define the Stretch region.

$$1/\lambda_s^{12} = 1/\lambda_s^{11} + \Delta v_1 \quad (3)$$

Further shown is an exemplary quantum efficiency curve, QE($\lambda$) 230, of the spectrometer to be used for the collection and analysis of the Raman signals generated by the first and second excitation wavelengths.

Accordingly, with a proper selection of the second excitation wavelength $\lambda_p^1$ 210 and the first excitation wavelength $\lambda_p^2$ 220 the generated Raman signals within both the Stretch region and the Fingerprint region may be captured by the detector element of a single spectrometer.

For the purposes of describing the subject matter regarded as the invention to those skilled in the art, the Fingerprint region wavenumber range and Stretch region wavenumber range are approximately equal, i.e., $\Delta v_1 \approx \Delta v_2$, resulting in $\lambda_s^{11} \approx \lambda_x^{21}$ and $\lambda_s^{21} \approx \lambda_s^{22}$.

Furthermore, while second excitation wavelength $\lambda_p^1$ 210 and first excitation wavelength $\lambda_p^2$ 220 may be selected to provide for the capture of both the Fingerprint and Stretch region using a same detector array, the selection of wavelengths $\lambda_p^1$ 210 and $\lambda_p^2$ 220 in accordance with the principles of the invention provides for the enhancement of the analytical performance of the spectrometer.

Figure 3A:
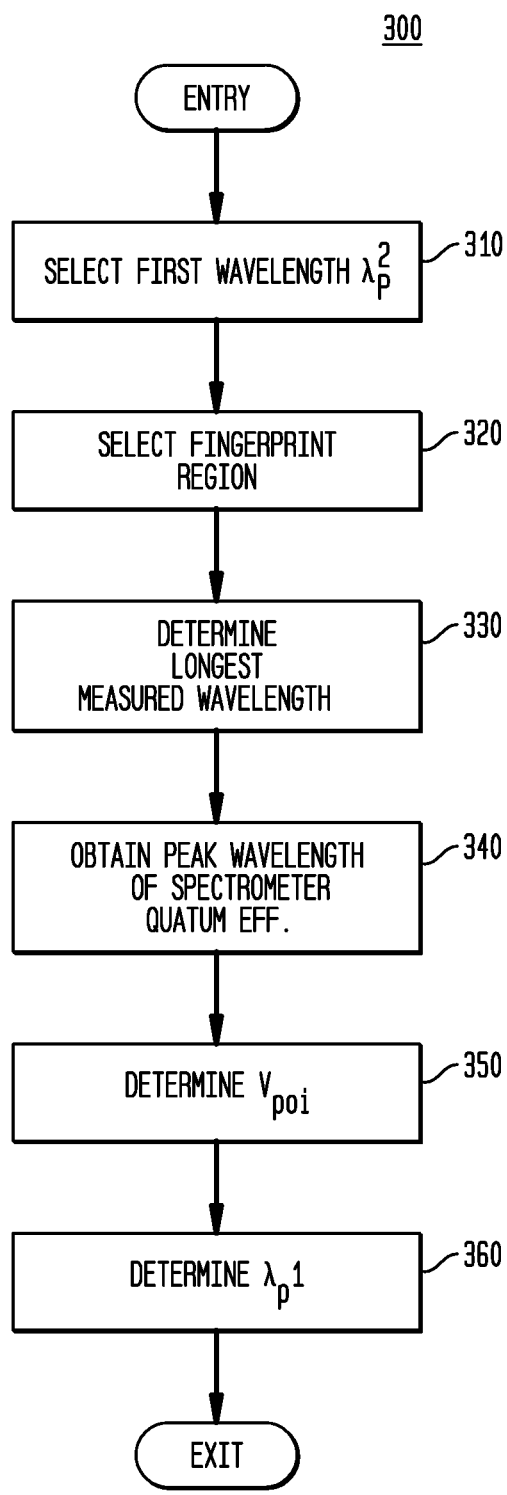
FIG. 3A illustrates a flow chart of an exemplary process for selecting laser wavelengths in a dual-wavelength Raman probe, in accordance with the principles of the invention.

FIG. 3 illustrates a flowchart 300 of an exemplary process for determining the wavelengths of a dual-wavelength Raman probe in accordance with the principles of the invention.

In accordance with the principles of the invention, at step 310, a first excitation wavelength (i.e., $\lambda_p^2$) is selected. The first excitation wavelength is associated with the Fingerprint region of the Raman signals reflected or scattered by the target object when illuminated by the first excitation wavelength.

The first excitation wavelength, $\lambda_p^2$, is selected to be as short as possible to mitigate fluorescence of the Raman spectra generated by the inelastic scattering of the first excitation wavelength by the target object. Thus, first excitation wavelength, $\lambda_p^2$, is determined based on the Raman target sample under investigation and its particular fluorescence characteristics when illuminated by the excitation wavelength.

For example, it would be known in the art that a first excitation wavelength, $\lambda_p^2$, for target classes of materials such as heavy petroleum (oil), biological materials, pharmaceutical materials and clear liquids may be selected as 1064 nm, 830 nm, 785 nm, and 532 nm, respectively.

For purpose of teaching the invention claimed, a wavelength such as 785 nm (nanometers) may be selected as the first excitation wavelength, wherein 785 nm is selected to minimize the fluorescence generated by the target object when illuminated by the first excitation wavelength.

The desired range of the Fingerprint region wavenumbers ($\Delta v_2$) is selected based on a desired spectral range and resolution of the spectrometer (e.g. 2000 cm$^{-1}$) at step 320.

The selection of the first excitation wavelength, $\lambda_p^2$ and $\Delta v_2$ defines the longest measured wavelength of the spectrometer ($\lambda_s^{22}$) (step 330) as $$\lambda_s^{22} = 1/[v_2 + 1/\lambda_p^2] \quad (4)$$

In this exemplary example with the use of a first excitation wavelength, $\lambda_p^2$, of 785 nm, the longest measured wavelength $\lambda_s^{22}$ may be determined from equation 4 above, as 931 nm.

Inspection of the quantum efficiency spectrum associated with the spectrometer to be used in the collection and analysis of the Raman signals may then be performed to determine a peak wavelength of the spectrometer quantum efficiency response, QE(λ), in the determined Fingerprint region (i.e., between wavelength $\lambda_p^2$ (which is approximately equal to $\lambda_s^{21}$) and $\lambda_s^{22}$ (step 340).

The quantum efficiency curve, QE(λ), provides a measure of the efficiency of the spectrometer to collect the Raman signals over a known wavelength band. For example, and for purposes of describing the invention claimed, the quantum efficiency response curve ($\lambda_{QE}$) within the range of the determined Fingerprint region may be determined from current measurements or previous measurements of the response characteristics of the spectrometer.

For example, and for the purpose of describing the invention claimed to those skilled in the art, and with reference to FIG. 2, a peak (maximum) quantum efficiency ($\lambda_{QE}$) 235 of the quantum efficiency response curve 230 within the determined Fingerprint region 223 may be determined. For the purpose of teaching the invention claimed, the peak quantum efficiency in this illustrated example may be determined to be 800 nm.

The Raman shifted peak of interest ($v_{poi}$) may then be determined for the specific chemical compound under investigation (i.e., target object) at step 350. For example, and for the purposes of describing the invention claimed to those skilled in the art, a Raman shifted peak of interest for a specific target object may be determined to be associated with a wavenumber of 3000 cm$^{-1}$.

The second excitation wavelength ($\lambda_p^1$) for quantitative analysis in the Stretch region may then be determined at step 360 as:

$$\lambda_p^1 = 1/[v_{poi} + 1/\lambda_{QE}] \quad (5)$$

Accordingly, the second excitation wavelength, ($\lambda_p^1$) may be determined based on the Raman shift peak of interest, which is associated with the specific target object, and the peak quantum efficiency of the spectrometer within the Fingerprint region, which is defined by the selection of the first excitation wavelength.

From the exemplary wavelength selected as the first excitation wavelength ($\lambda_p^2$) 220, for the exemplary Raman shifted peak of interest ($v_{poi}$) of 3000 cm$^{-1}$ and the peak quantum efficiency ($\lambda_{QE}$) 235, a second excitation wavelength ($\lambda_p^1$) 210 may be determined as 645 nm.

As would be appreciated, the selection of the second excitation wavelength in the manner disclosed in equation 5 provides for a coincidence of the Raman peak of interest wavelengths with the peak wavelength ($\lambda_{QE}$) of the spectrometer quantum efficiency within the Fingerprint region.

Hence, the analysis of the Raman signals associated with the second excitation wavelengths is performed at, or substantially close to, the peak quantum efficiency of the spectrometer which results in better analytical performance of the target object.

Although the selection of the second excitation wavelength is determined based of the peak quantum efficiency, as expressed in equation 5, and the most significant spectra performance may be achieved when the determined second excitation wavelength is coincident with the peak quantum efficiency, it would be recognized that a non-peak quantum efficiency value may similarly be utilized to determine the second excitation wavelength. That is, in accordance with the principles of the invention, the term "peak" as used with regard to the term "peak quantum efficiency" need not be the "peak" or maximum value as used in the ordinary and customary sense. Rather the term "peak" as used herein is considered to be a range about the maximum (or peak) value of spectra quantum efficiency. For example, the range may be defined by a range of +/−10 percent of the wavelength number of the maximum value of the spectra quantum efficiency. Similarly, the range may be defined as +/−15 percent of the wavelength number of the maximum value of the spectra quantum efficiency. In another example, the range may be defined as the wavelength numbers within 3 dB of the maximum value of the spectra quantum efficiency. See for example, FIG. 2, wherein points 240a, 240b represent the 3 db (or half-power) points with respect to the peak quantum efficiency 235. In accordance with another aspect of the invention, the specific range may be determined by a desired increase in the signal-to-noise ratio of the received Raman spectra.

Accordingly, the determination of a second excitation wavelength base equation 5 may be more generally expressed as:

$$\lambda_p^1 = 1/[v_{poi} + 1/(\lambda_{QE} + (+/- \delta))] \quad (6)$$

where δ represents a range about the maximum (peak) quantum efficiency value.

Thus, in accordance with the principles of the invention, the term "peak" is considered to be one of: the maximum value of the response spectra of the spectrometer and a range about the maximum value of the response spectra of the spectrometer.

Figure 3B:
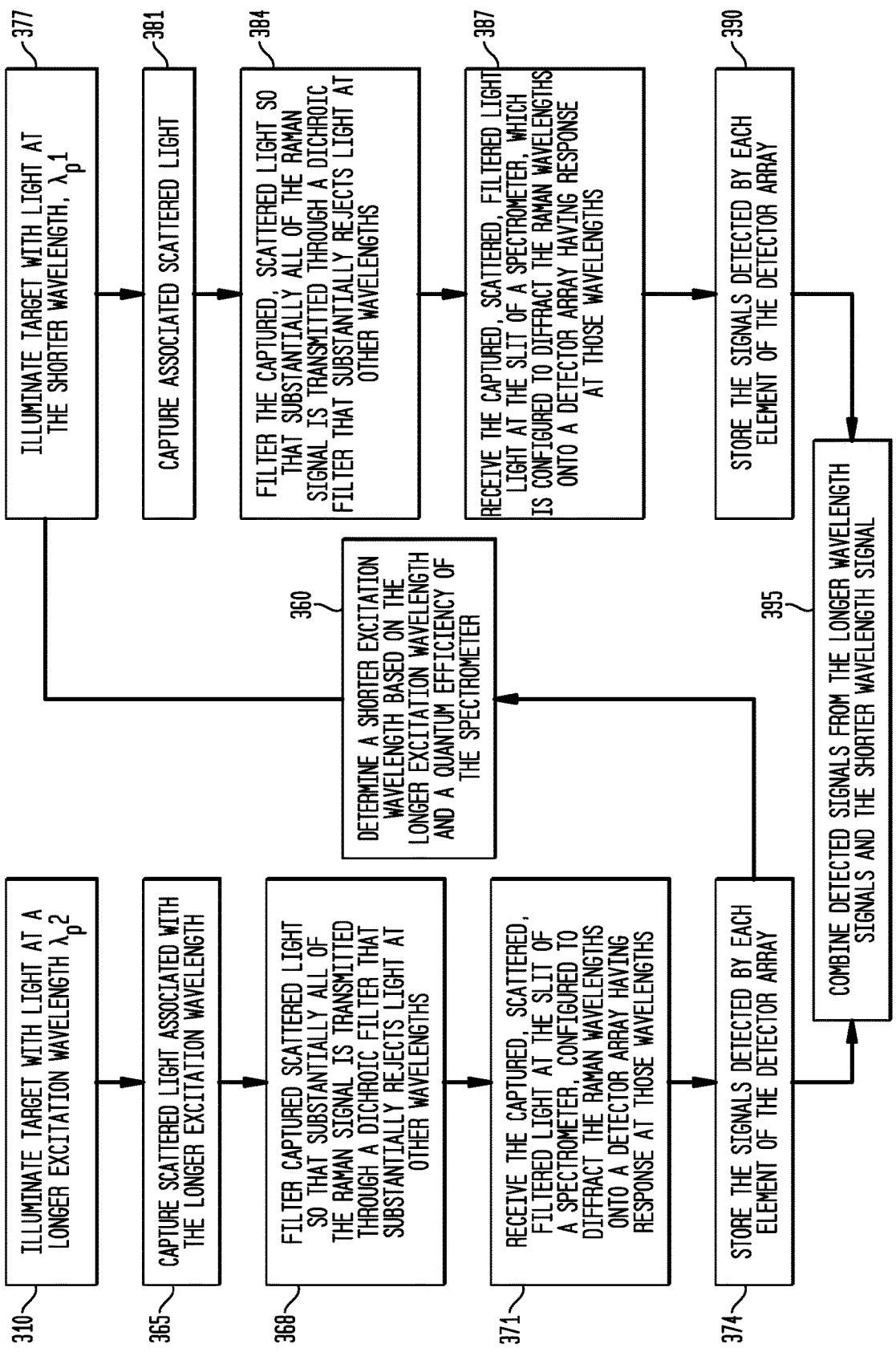
FIG. 3B illustrates a flow chart of an exemplary process associated with a dual-wavelength Raman probe in accordance with the principles of the invention.

FIG. 3B illustrates an exemplary process for operating a dual-wavelength Raman probe in accordance with the principles of the invention.

In accordance with the principles of the invention, a first spectral Raman component generated by the excitation of the target object by a first excitation wavelength, is captured, filtered, received, processed and stored as shown in steps 310, 365, 368, 371, 374, respectively. More specifically, a target object is illuminated by a first excitation wavelength (i.e., $\lambda_p^2$), which has been selected to minimize the fluorescence generated by the target object when illuminated by the first excitation wavelength. The Raman scattered light reflected or scattered by the target object is captured at step 365. The Raman scattered light is then filtered at step 368 and provided to the spectrometer at step 371. At step 374, a spectral analysis performed on the reflected or scattered signals provided to the spectrometer are then stored at step 374.

At step 360, a second excitation wavelength (i.e., $\lambda_p^1$) is determined based on the first excitation wavelength and the quantum efficiency of the spectrometer within the Fingerprint region determined based on the first excitation wavelength, as discussed above.

In accordance with the principles of the invention, after a determination of the second excitation wavelength based on equation 5 above, is made, an evaluation of the determined second excitation wavelength may be made with regard to wavelength performance of conventional laser devices in order to determine a suitability of using conventional lasers having known wavelength output.

That is, the wavelengths of one or more selected conventional lasers may be evaluated with regard to equation 6 to determine which of the more or more selected conventional lasers may be used in place of specially designed lasers that output a wavelength based on equation 5.

A second Raman component generated by the excitation of the target object by the determined second excitation wavelength, is captured, filtered, received, processed, and stored as shown in steps 377, 381, 384, 387, 390, respectively. Specifically, the target object is illuminated by the second excitation wavelength at step 377. The scattered or reflected Raman wavelengths associated with the second excitation wavelength are captured (step 381) and filtered at step 384. At step 387, the Raman wavelengths are provided to the spectrometer and at step 390, the results of a spectral analysis performed by the spectrometer are stored.

At step 395, the first and second Raman spectral component data are concatenated, or combined together, wherein the first Raman spectral component may be used to determine an identification of a compound of the target object, while the second Raman spectral component may be used to determine a concentration of the compound of the target object. Alternatively, the first and second Raman spectral may be processed independently to provide a more detailed analysis of the target object. The selection of the first and second excitation wavelengths in accordance with the principles of the invention provides for enhanced quantitative analysis as the Raman spectrum coincides (or substantially coincides) with a peak of the quantum efficiency of the spectrometer within the Fingerprint region. The increased signal-to-noise ratio of the received Raman signals caused by the coincidence of the Raman signal with the peak of quantum efficiency of the spectrometer provides for an increase in the distinguishing features of the target object (or the component under analysis within the target object).

Accordingly, the dual laser Raman Probe described herein provides opportunities to monitor, for example, a pharmaceutical bioreactor (i.e., a sealed vessel in which bacteria are grown in an aqueous liquid). In another aspect, an H Stretch band may be used as a calibration standard against which CH and NH Stretch bands and be monitored. For example, the CH and NH Stretch bands may be used to determine changes in proteins within a pharmaceutical bioreactor as proteins are generated by a bacteria and food (carbohydrates) are consumed. In accordance with another application of the dual laser Raman probe disclosed herein, a concentration of an additive may be determined by calibration using the Raman signal of pure water.

FIGS. 4A and 4B illustrate a typical silicon detector quantum efficiency curve (FIG. 4A) and a corresponding table (FIG. 4B) Illustrating the expected quantum efficiency vs. wavenumber for a first Raman pump laser source for a 300 nm wavelength dispersion range.

Referring to FIG. 4A, which illustrates an exemplary quantum efficiency vs. wavenumber, and the efficiency associated with the wavelength shift associated with a785 nm pump laser source, a wavelength shift of the 785 nm excitation wavelength associated with a 200 cm$^{-1}$ wavenumber provides for a quantum efficiency of 96%, whereas a wavelength shift associated with a 3600 cm$^{-1}$ wavenumber provides for an efficiency of 1%. Hence, an analysis of the Raman shifted wavelength associated with a 785 nm excitation wavelength at a 200 cm$^{-1}$ is significantly better than an analysis of a Raman shifted wavelength, associated with a 785 nm excitation wavelength, at a 3600 cm$^{-1}$, as the performance of the spectrometer is significantly greater for the Raman shifted wavelength at 200 cm$^{-1}$.

FIG. 4B tabulates the quantum efficiency for spectrometer efficiency associated with a 785 nm excitation wavelength for different wavelength shifts.

Figures 5A, 5B:
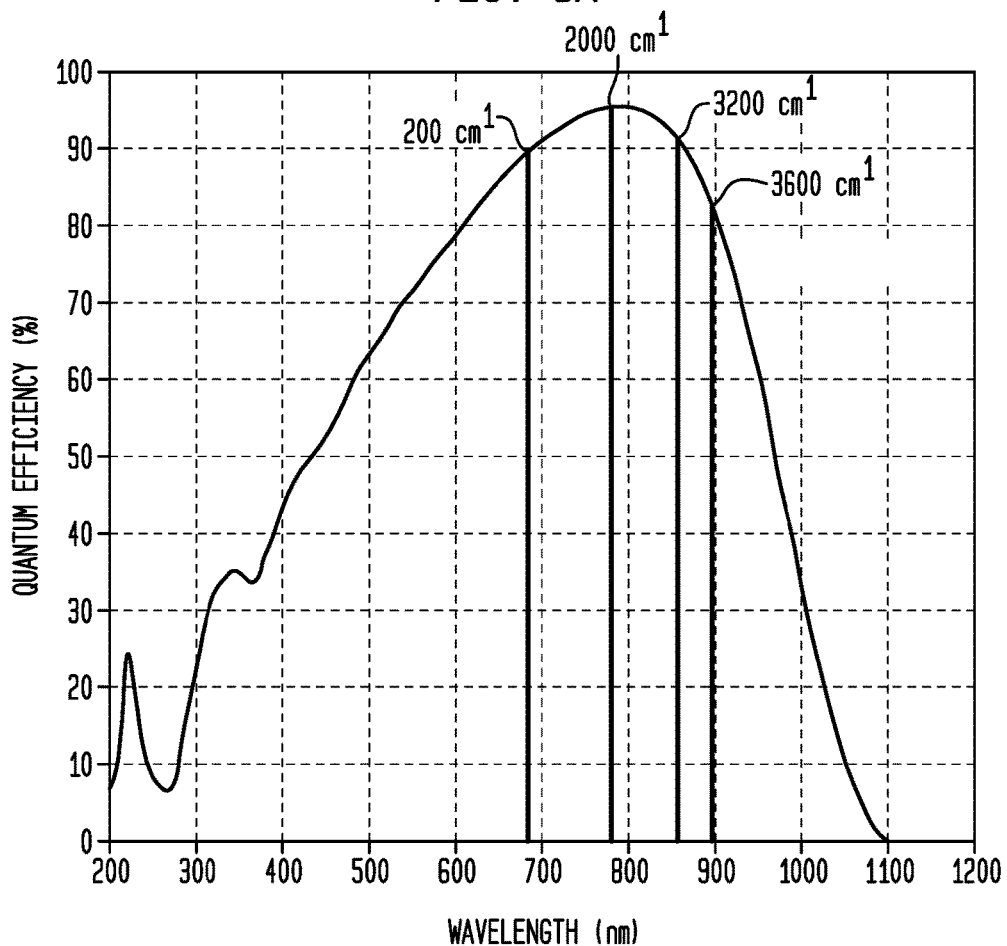
FIGS. 5A and 5B illustrate a second exemplary quantum efficiency response of a silicon detector linear array with 300 nm dispersion for two different Raman laser pump sources in accordance with the principles of the invention.

FIGS. 5A and 5B illustrate the efficiency improvement and a corresponding table obtained for the selection of excitation wavelengths, in accordance with the principles of the invention.

In accordance with the principles of the invention, selection of the second excitation wavelength (e.g., 680 nm), based on the first wavelength and the spectral efficiency of the spectrometer, provides for a quantum efficiency of 90 percent at 200 cm$^{-1}$ whereas a wavelength shift associated with a 3600 cm$^{-1}$ wavenumber provides a quantum efficiency of 82%. Hence, the selection of the second excitation wavelength in accordance with the principles of the invention provides significant improvement of the analysis of the Raman signals.

Hence, selection of the dual excitation wavelengths through the matching of the peak of the quantum efficiency curve to particular wavenumber band of interest, in accordance with the principles of the invention, provides for an enhancement in the signal processing capability of the spectrometer.

An example, of the selection of the first and second excitation wavelengths may be determined as follows:

| $\lambda_p^2$ - Fingerprint Laser Wavelength (nm) which is approximately $\lambda_s^{21}$ (nm) | Wavenumberp2 (cm−1) |
|---|---|
| 1064 | 9398.496241 |
| $\Delta v2$ - Delta Wavelength Target (cm-1) | |
| 2000 | |
| $\lambda_s^{22}$ = QE Range limit (nm) | |
| 3351.626016 | 7398.496241 |
| QE Peak Wavelength (nm) | (cm−1) |
| 1100 | 9090.909091 |
| Raman Peak of interest (cm−1) | |
| 3000 | |
| $\lambda_p^1$ - Concatenation Excitation Wavelength (nm) | |
| 827.0676692 | 12090.90909 |

Accordingly, a selection of a second excitation wavelength of 827.0676692 nm in accordance with the principles of the invention provides an improved, enhanced, signal-to-noise ratio in the Raman signal analyzed.

Furthermore, with the enhanced Stretch band signal, the entire enhanced Stretch band may be used for additional data as input for chemometrics algorithms or as orthogonal data to validate of data from the Fingerprint region.

For example, the Raman probe excitation wavelength selection method described, herein, may have use in medical diagnostics as fats and proteins may be monitored using the CH and NH bands and water using the OH band water.

Analysis of the CH and NH bands, with the improved or enhanced signal analytical performance described, herein, may help diagnose inflammation or other pathological conditions.

The Raman probe excitation wavelength selection method described, herein, may have use in pharmaceutical process analytics for compound grown in water (H$_2$O) as analysis of such compounds using near-infrared (NIR) spectroscopy is not effective.

The Raman probe excitation wavelength selection method described, herein, may have use to analyze petrochemicals as CH bands are important and where water is generally a contaminant.

Generally speaking, the invention encompasses the use of a device as described herein in medical diagnostics and in analyses associated with petrochemical processing or bioreactors.

Figure 6B:
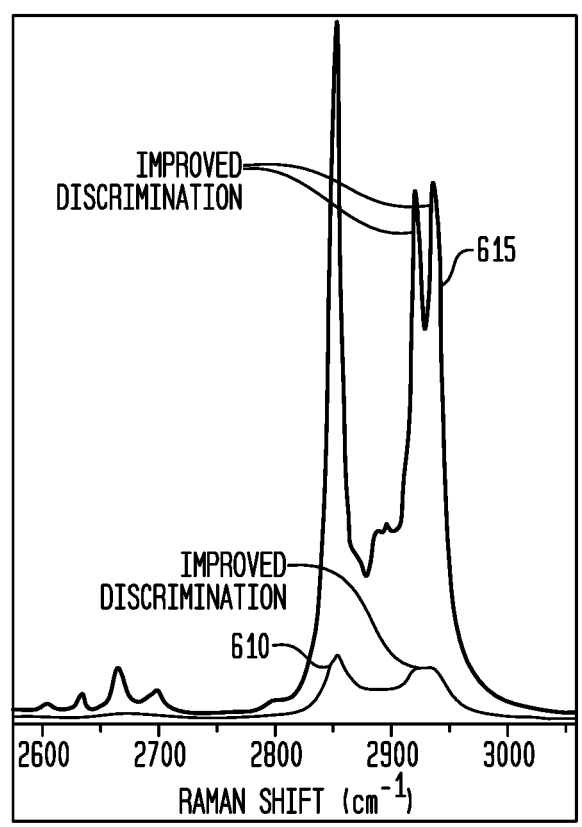
FIG. 6B illustrates an expanded section of the spectral analysis shown in FIG. 6A.
Figure 6D:
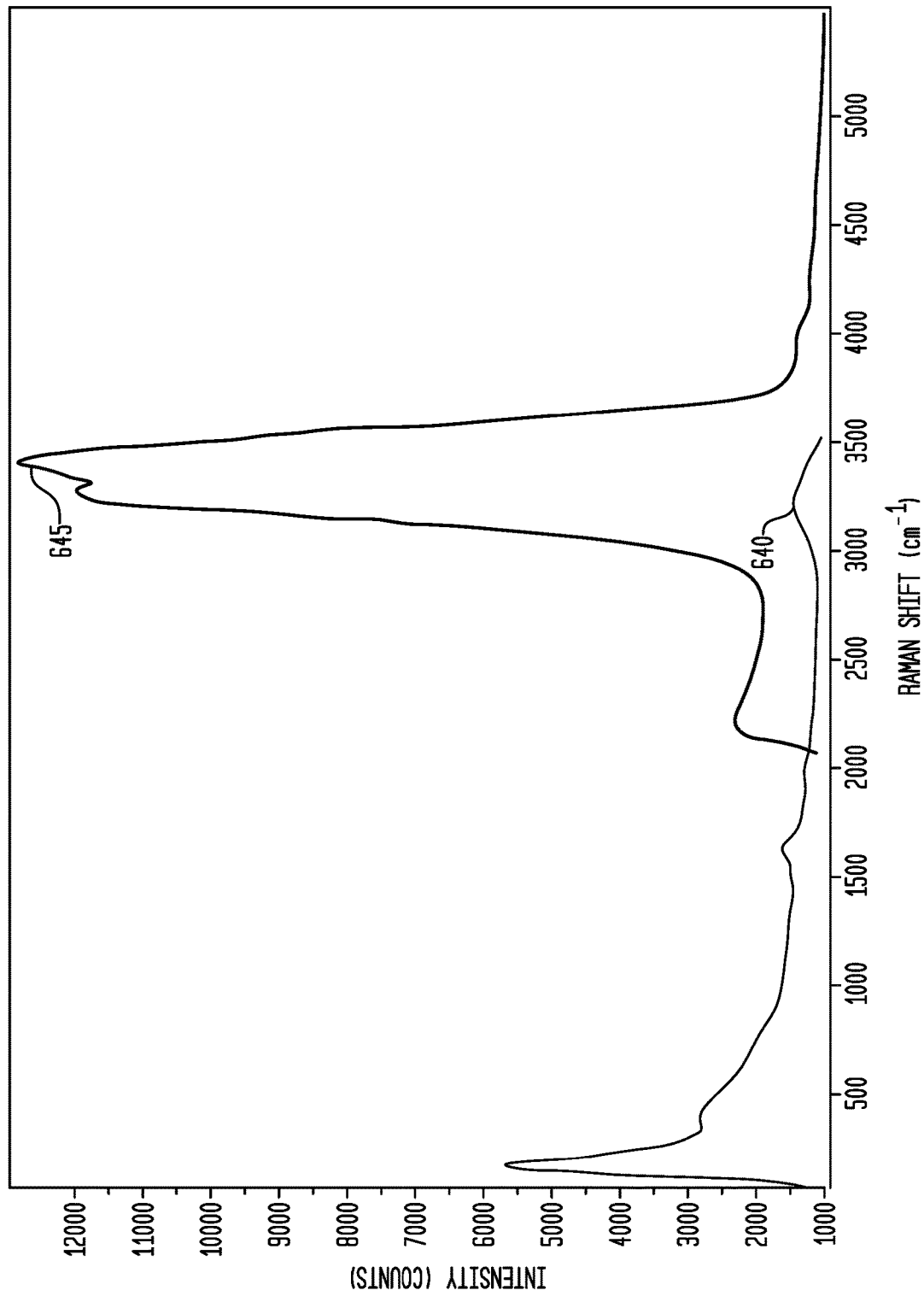
FIG. 6D illustrates an exemplary spectral analysis of a target material containing water.

FIGS. 6A and 6B illustrate an examples of the enhancement of Raman signal processing using a wavelength laser pump source in the Stretch band region in accordance with the principles of the invention for cyclohexane.

Specifically, FIG. 6A illustrates the spectral analysis associated with the Fingerprint region and the Stretch region associated with a target object including cyclohexane. FIG. 68 illustrates an expanded version of the Stretch region shown in FIG. 6A.

FIG. 6A illustrates two Raman spectra 610 and 615, wherein spectra 610 is obtained using a 785 nm wavelength laser excitation signal and spectra 615 is obtained using a 785 first excitation wavelength of 785 nm and a second excitation wavelength of 680 nm, wherein the 680 nm wavelength is selected in accordance with the principles of the invention disclosed herein.

In accordance with the principles of the invention, dual-wavelength Raman probe technology disclosed, herein, enables new applications in the process automation market. For example, the use of —H Stretch region vs. Fingerprint region may provide for improved quantitative measurement of changes in concentration or predictive quantitation of concentration. For example, the dual-wavelength Raman probe with the wavelength selection as presented, herein, may be directly applicable to enhance the analysis of:
- % petroleum products in water
- contaminants in water
- % sugar in water
- % protein in water
- % sugar/protein vs. time in a biopharma process reaction
- Identification of bacteria byproduct (e.g. are you producing what you want?)
- Ratio Intensity of one set of peaks vs another (e.g. reduces complexity of system calibration)
- Monitoring the intensity of one or multiple peaks over time.
- Higher sensitivity due to reduction in noise floor (increased S/N)
- Optimizing the Raman band of interest and the quantum efficiency of the detector (e.g. amplifying of the signal of Alkyne bands)
- Pass/fail analysis (e.g. Identifying the presence or lack thereof of specific bands).

In summation, a dual-wavelength Raman probe system comprising first and second excitation wavelengths impinge upon a target object and the reflected or scatted wavelength by the target object are collected and analyzed by a spectrometer. In accordance with the principles of the invention, the excitation wavelengths are selected based on the target object and the quantum efficiency (or within a known range) of the spectrometer in order to improve the signal to noise ratio of the Raman signals by having the Raman signals substantially coincide with the peak quantum efficiency of the spectrometer. Collection of the Raman signals substantially coincident with the peak quantum efficiency of the spectrometer provides for an improved signal to noise ratio of the Raman signal.

Although the invention has been described with regard to "a wavelength" emitted by the laser source or operated on by the Raman and Rayleigh scattering it would be recognized that the term "a wavelength" is a term of art and refers to a wavelength or a band of wavelengths around a nominal desired wavelength. The invention has been described with reference to specific embodiments. One of ordinary skill in the art however appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention. Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content dearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A Raman probe apparatus comprising: a spectrometer a first laser source emitting a first laser light at a first excitation wavelength, λp2; a second laser source emitting a second laser light at a second excitation wavelength, λp1,wherein said second excitation wavelength, λp1 is selected as substantially a wavelength associated with a peak value of a quantum efficiency of said spectrometer and within a wavelength range defined by the first excitation wavelength, λp2, wherein said first excitation wavelength is selected based on a fluorescence wavelength generated by an interaction of the first excitation wavelength with said target object; a first dichroic mirror configured to: receive the first excitation wavelength; and receive the second excitation wavelength; a second dichroic mirror configured to: receive the first excitation wavelength light and the second excitation wavelength, transmit the first excitation wavelength and the second excitation wavelength toward a target object; receive a first Raman light associated with the transmitted first excitation wavelength, and receive a second Raman light associated with the second excitation wavelength, said first Raman light and said second Raman light representing interaction of said second excitation wavelength and said second excitation wavelength, respectively, with said target object; focusing optics configured to: receive said first excitation wavelength, receive said second excitation wavelength; focus said first excitation wavelength and said second excitation wavelength onto said target object: collect said first Raman light; collect said second Raman light; and direct said collected first Raman light and said collected second Raman light towards said second dichroic mirror; a filter configured to: receive said collected first Raman light and said collected second Raman light from said second dichroic mirror, transmit, from said collected first Raman light and said collected second Raman light, wavelengths other than the first excitation wavelength and the second excitation wavelength, to said spectrometer.

2. The Raman probe apparatus of claim 1, wherein at least one of the first laser source and the second laser source is external to the Raman probe apparatus.

3. The Raman probe apparatus of claim 1, wherein said first excitation wavelength and said second excitation wavelength are emitted concurrently.

4. The Raman probe apparatus of claim 1, wherein said first excitation wavelength and said second excitation wavelength are emitted sequentially.

5. The Raman probe apparatus of claim 1, wherein said second excitation wavelength is determined as:

$$\lambda p1 = 1/[Vpoi + 1/\lambda qe]$$

wherein $\lambda qe$ is a wavelength associated with a peak quantum efficiency within said wavelength range defined by the first excitation wavelength; and
Vpoi is the Raman shifted peak of interest for the target object.

6. The Raman probe apparatus of claim 1, wherein the first excitation wavelength is selected based on said fluorescence generated by the target object when illuminated by the first excitation wavelength does not obscuring the first Raman light.

7. The Raman probe apparatus of claim 1, wherein said target object is associated with medical diagnostics.

8. The Raman probe apparatus of claim 1, wherein said target object is associated with petrochemical processing.

9. The Raman probe apparatus of claim 1, wherein said target objects is associated with bioreactors.

10. The Raman probe apparatus of claim 1, wherein said second excitation wavelength is determined as:

$$\lambda p1 = 1/[Vpoi + 1/(\lambda qe + (+/-\delta))]$$

wherein $\lambda qe$ is a wavelength associated with a peak value of said quantum efficiency within a range defined by the first excitation wavelength; $\delta$ is a region about the peak quantum efficiency value; and Vpoi is the Raman shifted peak of interest for the target object.

11. A method for determining a first excitation wavelength [Xp2] and a second excitation wavelength ($^\wedge$p1) for use in a dual laser spectrometer system comprising: a first laser configured to emit said first excitation wavelength; a second laser configured to emit said second excitation wavelength; and a spectrometer configured to receive a first Raman signal and a second Raman signal, wherein said first Raman signal is associated with said first excitation wavelength and said second Raman signal is associated with said second excitation wavelength, said method comprising: selecting said first excitation wavelength based on at least one characteristic of a target object, wherein said at least one characteristic is associated with a fluorescence generated by an interaction of the first excitation wavelength with said target object; determining a Fingerprint range of a first Raman component associated with said first excitation wavelength; determining a wavelength associated with a peak quantum efficiency value (Aqe) within the determined Fingerprint region of a quantum efficiency curve, QE(A.), associated with said spectrometer; determining a Raman shifted peak of interest (vp0i) for the target object; and determining said second excitation wavelength based on the peak quantum efficiency value and the Raman shifted peak of interest (vp0i).

12. The method of claim 11, wherein said second laser light wavelength is determined as:

$$\lambda p1 = 1/[Vpoi + 1/\lambda qe]$$

wherein $\lambda qe$ is the wavelength associated with said peak quantum effiency value within a Fingerprint range associated with the first excitation wavelength and
Vpoi is the Raman shifted peak of interest for the target object.

13. A Raman probe apparatus comprising: a spectrometer; a first laser source emitting a first laser light at a first excitation wavelength, $\lambda p2$; a second laser source emitting a second laser light at a second excitation wavelength, $\lambda p1$, wherein said second excitation wavelength, $\lambda p1$ is selected as a wavelength associated with a peak value of a quantum efficiency of said spectrometer within a wavelength range defined by the first excitation wavelength and a Raman shifted peak of interest for a target object; focusing optics configured to: focus said first laser light and said second laser light onto said target object; and collect a corresponding one of a first Raman light and a second Raman light, reflected from said target object; and a filter configured to: receive said collected light, transmit, from the collected light, wavelengths other than the first laser light and the second light, to said spectrometer.

14. The Raman probe apparatus of claim 6, wherein at least one of the first laser source and the second laser source is external to the Raman probe apparatus.

15. The Raman probe apparatus of claim 6, wherein said first laser light and said second laser light are emitted concurrently.

16. The Raman probe apparatus of claim 6, wherein said first laser light and said second laser light are emitted sequentially.

17. The Raman probe apparatus of claim 6, wherein said second laser light wavelength is determined as:

$$\lambda p1 = 1/[Vpoi + 1/\lambda qe]$$

wherein $\lambda qe$ is a wavelength associated with a peak of said quantum efficiency within said wavelength range associated with the first excitation wavelength; and
Vpoi is the Raman shifted peak of interest for the target object.

18. The Raman probe apparatus of claim 6, wherein said target object is applicable to at least one of: medical diagnostics, petrochemical processing, and bioreactors.

19. The Raman probe apparatus of claim 6, wherein said second excitation wavelength is determined as:

$$\Delta p1 - 1/[Vpoi + 1/(\lambda qe + (+/-\delta))]$$

wherein $\lambda qe$ is a wavelength associated with a peak value of said quantum efficiency within a range defined by the first excitation wavelength; $\delta$ is a region about the peak quantum efficiency value; and Vpoi is the Raman shifted peak of interest for the target object.

* * * * *